INVENTOR.
PAUL KEHLER
BY Young & Quigg
ATTORNEYS

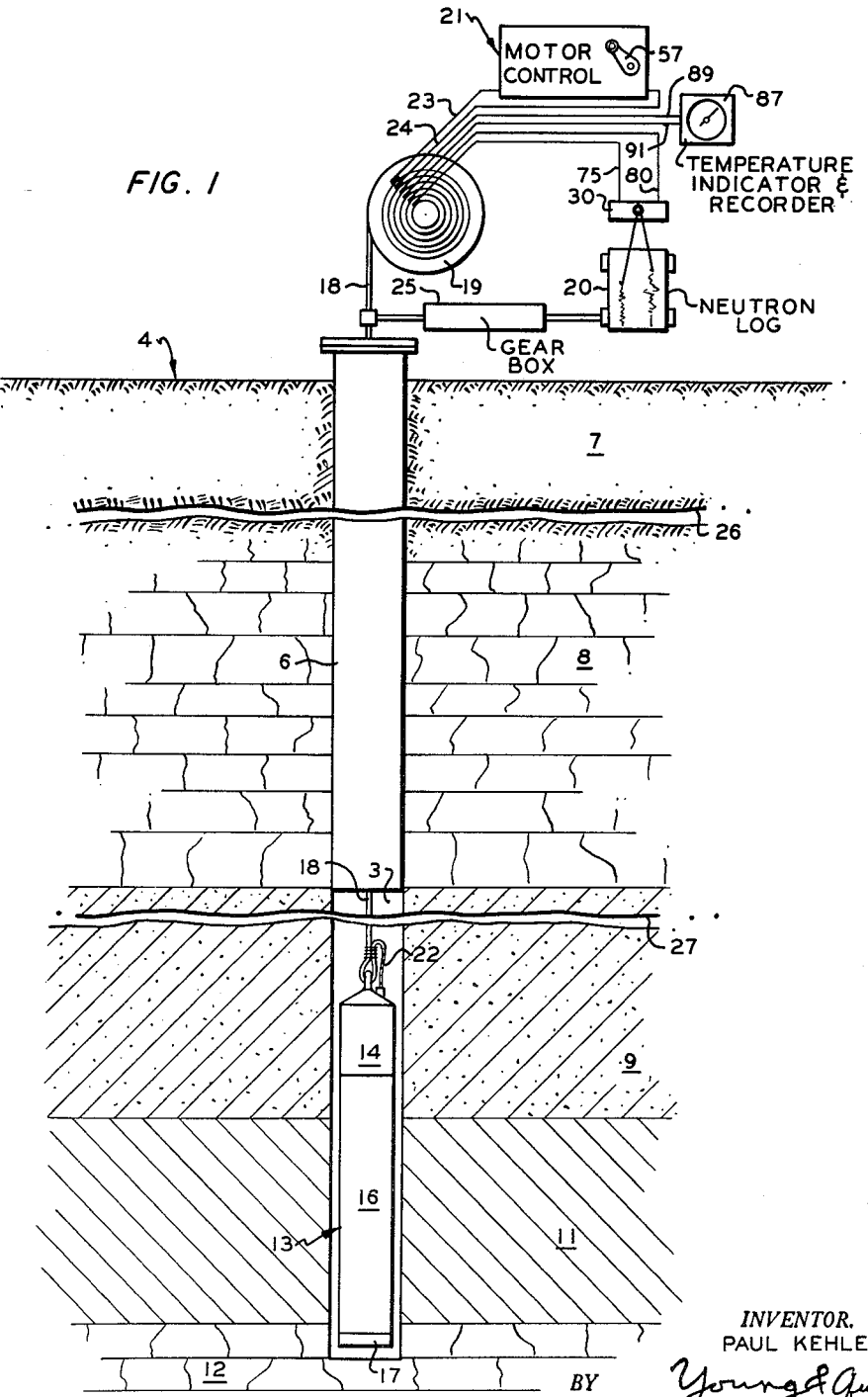

ƯUnited States Patent Office 3,170,842
Patented Feb. 23, 1965

3,170,842
SUBCRITICAL BOREHOLE NUCLEAR
REACTOR AND PROCESS
Paul Kehler, Bartlesville, Okla., assignor to Phillips
Petroleum Company, a corporation of Delaware
Filed Nov. 6, 1961, Ser. No. 150,536
14 Claims. (Cl. 176—11)

This invention relates to a novel, subcritical, nuclear reactor and neutron-producing means. In another aspect it relates to one suitable for use in the borehole of a well. In another aspect it relates to processes of operating said novel reactor. In another aspect it relates to logging a borehole with a nuclear reactor, heating a borehole with a nuclear reactor, or in situ pyrolysis of oil shales by heating, employing a nuclear reactor in a borehole as a heat source in said shale. It also relates to nuclear reactors having a widely variable, predetermined power output and rate of neutron production and to means to vary or to hold constant said power output or rate of neutron production at a predetermined level suitable for the selected purpose for which said nuclear reactor is to be used. In another aspect it relates to a nuclear reactor comprising a plurality of subcritical stages energized to a level of neutron production or power output dependent on the position of a primary neutron generator which is movable relative to the body of said nuclear reactor by suitable mechanical means.

In the prior art of borehole nuclear reactors, such as shown in Frey, Jr., et al. 2,951,946 or Goodman 2,952,019, both of September 6, 1960, there is only one subcritical nuclear reactor stage in each and as a result the obtainable power is quite limited. The present invention is capable of producing many times their neutron production or power with far safer operation because its individual stages may operate at a lower power level than the single stage of the prior art devices, yet due to a plurality of stages produce many times the neutron production or power. As an additional safety feature, said primary neutron generator is secured to the means to move it relative to the body of said nuclear reactor by a thermal fuse link, so that if the heat of nuclear reaction reaches a predetermined excessive value the link will melt, freeing the primary neutron generator, which falls into a well in a neutron shield where it can no longer substantially excite the nuclear reaction. This withdrawal of the primary neutron generator immediately slows down the subcritical reactors, reducing the temperature, the neutron flux, and the power and heat being produced. Furthermore, the reactive nuclear fuel is divided into a plurality of subcritical fuel zones by a first layer of a neutron-slowing moderator material capable of converting the majority of the fast nascent neutrons from the nuclear reaction in said fuel to slower thermal neutrons, said first layer having adjacent one side a second layer of a thermal neutron barrier material capable of stopping the majority of said thermal neutrons, but passing a majority of the fast nascent neutrons, so that the first and second layers have polar properties permitting neutron flow from a first fuel zone first through the barrier and then through the moderator into a second fuel zone but preventing neutron flow from said second fuel zone first through said moderator and then through said barrier.

One object of this invention is to provide a novel nuclear reactor having a plurality of subcritical zones and excited by a neutron source movable relative to said zones.

Another object is to provide a variable-power nuclear reactor.

Another object is to provide such reactors suitable for use in a well bore.

A further object is to provide a high-energy, variable-power, subcritical nuclear reactor suitable for use in a well bore for excitation of the surrounding strata for well logging purposes, or for heating the formation, or for the hydrolysis by heat of the surrounding oil shale, depending on the selected power output.

Other objects are to provide novel apparatus and processes for using and regulating said novel nuclear reactors.

Numerous other objects and advantages will be apparent to those skilled in the art upon reading the present specification and accompanying drawings and claims.

In the drawings:

FIGURE 1 is an elevational view, with the earth shown in cross section, of a well bore containing a nuclear reactor embodying the present invention;

Figure 3:
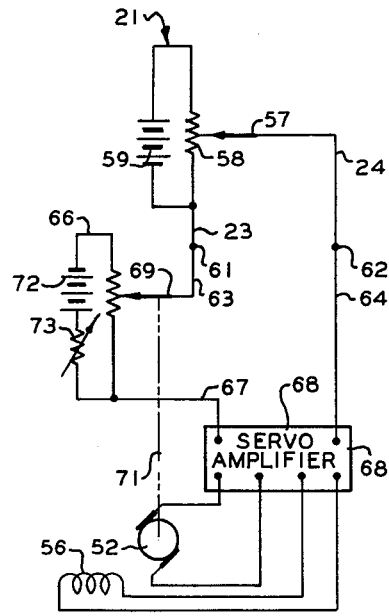
FIGURE 3 is a schematic wiring diagram of a suitable manual motor control located at the surface of the ground as shown in FIGURE 1.

In FIGURE 1 the borehole 3 of a well is shown extending down into the earth, generally designated as 4. The upper portion of the borehole 3 may be lined with a pipe or well casing 6. The earth 4 may comprise different strata, such as overburden 7, rock layers 8, gas-containing sand 9, oil sand or oil shale 11, and rock layers 12. Generally, well 3 has been drilled in order to explore or exploit the hydrocarbon-containing strata 9 and 11.

Lowered into borehole 3 through casing 6 is a nuclear reactor, generally designated as 13, embodying the present invention. Nuclear reactor 13 may be divided into a power source control section 14, the body of the nuclear reactor 16, and a detector or well-logging section 17. The reactor 13 is suspended in the well by cable 18 from any suitable hoist mechanism 19, while control section 14 is electrically connected to the controls and recorders generally designated as 21 at the surface of the ground by means of an electrical cable 22 containing a plurality of electrical conductor wires (not shown) which are connected to corresponding conductor wires inside cable 18, each wire being connected finally to a corresponding slip ring on hoist drum 19 connected by a brush connection (23 or 24, for example) to the controls and recorders generally designated as 21. Recorder 20 may be driven from cable 18 through gear box 25 as in Scherbatskoy 2,648,012, August 4, 1953, or Jones 2,857,522, October 21, 1958. As indicated by the breaking away of FIGURE 1 at 26 and 27, the depth of the borehole 3 and the portion that is lined with casing 6 may vary widely from well to well, depending on the various geological strata penetrated thereby and the use for which the well is intended by the operator.

Figure 2:
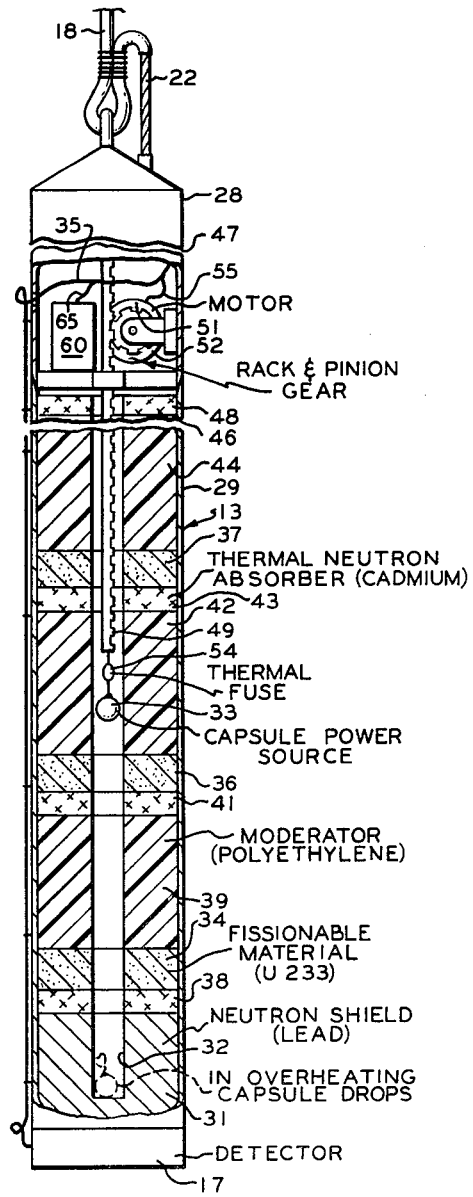
FIGURE 2 is an enlarged view of the nuclear reactor shown in FIGURE 1 with parts broken away to show details of construction.

In FIGURE 2 the nuclear reactor 13 of FIGURE 1 is shown on an enlarged scale with parts broken away to show details of construction. Reactor 13 is suspended by hoist cable 18 and is connected to motor control 21 by electrical conductors 23 and 24 as shown in FIGURE 1. Reactor 13 is preferably made with a sectional casing comprising a motor housing cap 28, a fuel housing casing 29 and detector housing 17.

In detector housing 17 a conventional Geiger tube or proportional counter and recorder similar to part 45 of Frey, Jr., et al. 2,951,946, supra, may be employed, or the Geiger detector 42 and circuit 43 of Goodman, supra, or any of the other neutron or gamma ray logging devices well known in the prior art may be employed. Therefore, no further description of detector 17 or recorder 20 is believed necessary. Detector 17 may be connected to recorder 30 through electric cables 35, 22 and 18, or radio transmission of signals (not shown) can be used between the detector and recorder.

In the bottom of the fuel casing 29, a cylinder of lead 31 is disposed having a cylindrical hole 32 bored along its vertical axis to a depth sufficient to provide a well into which a capsule power source 33 may fall or be lowered so that the major portion of the neutrons produced by source 33 are absorbed in the lead 31 and only a minor portion of the fast neutrons from said power source having energy greater than 1 m.e.v. can pass up bore 32 and reach the lower portion of fissionable material 34, which absorption in effect will cause the nuclear reaction in fissionable material 34, 36 and 37 to die out rapidly to the normal low level of gradual natural radioactive decay of the particular fuel selected for use in fuel cylinders 34, 36 and 37. Stacked in layers in casing 29 above the neutron shield 31 are a series of cylinders, each having a continuation of bore 32 along its vertical axis, these cylinders being disposed upwardly in the following order: namely, cylinder 38 which is made of a material such as cadmium, which is a good thermal neutron absorber; fuel cylinder 34 which is made of fissionable material (which may include fissile material) such as uranium$^{233}$, or uranium$^{235}$, for which the chemical symbol is U, or plutonium$^{239}$, or suitable mixtures of the same with or without amounts of suitable diluent material, such as graphite, or water, said diluent material preferably being substantially nonfissionable. On top of fuel cylinder 34 is placed a moderator cylinder 39 which may be made of polyethylene or which may be replaced by an annular container (not shown) containing heavy water (deuterium oxide, D$_2$O). Continuing upwards, this order of elements is repeated with an absorber cylinder 41 similar to 38, a fuel cylinder 36 similar to 34, a moderator cylinder 42 similar to 39, and then repeated again with an absorber cylinder 43 similar to 38, a fuel cylinder 37 similar to 34 and a moderator cylinder 44 similar to 39. While three series are shown of these respective cylinders, it should be understood that my invention comprises a plurality of series, including from two series to as many series as will fit in casing 29, which is shown broken away at 46 and 47 to indicate the variable length it may have in the practice of this invention. While the exact order of absorber, fuel element and moderator is essential to the practice of the invention, it is not necessary that the top or bottom element be any particular element. While in FIGURE 2 the bottom element 38 and the top element 48 are both thermal neutron absorbers, because of the additional protective value that they give, any of the three types of elements could be the top or bottom of the pile provided there are at least two complete sets of the three elements arranged in series in the order specified in fuel casing 29.

The present invention lies in the geometry and arrangement of parts, as once this is understood anyone skilled in the art can select suitable fuel, moderator and thermal neutron barrier materials, and calculate the critical dimensions of each part. "Nuclear Science and Engineering," volume 9, number 3, March 1961, pages 377–390, teaches that the minimum critical dimension for common fuel elements is about 10 cm. (4 inches diameter), which can easily be placed in a well bore, which often is at least 6 inches in diameter for very deep wells and can be 12–18 inches in diameter for shallower wells. The critical dimension varies with the purity and type of fuel and the thickness and type of moderator employed. Critical minimum dimensions of concentrated U$^{235}$ fuel are about 5.5, 5.75 and 5.95 cm. for 50, 25 and 12.5 cm. of D$_2$O moderator for an infinite slab geometry. The thermal neutron barrier or absorber can be a plate of cadmium from about 10 to 20 mils thick, or correspondingly thicker plates of boron may be employed in the practice of this invention.

In place of D$_2$O (heavy water) as the moderator material, polyethylene may be employed because it is composed of one mol of carbon per mol of hydrogen, both C and H being good moderators. The thickness of the polyethylene moderator should be 1.5 times the thickness of a D$_2$O moderator to obtain equivalent results.

The present invention does not propose any specific novel materials as fuel, moderator material, or neutron absorber material, or any novel combination of specific materials, and those skilled in the art can select the desired materials and easily calculate the desired subcritical dimensions of each. However, the present invention is first to use alternate layers of suitable fuels, moderators and absorbers in combination with a movable neutron generator. There are many publications on the proper size of the individual elements. For example, "Nuclear Science and Engineering," volume 8, page 570 (1960), discusses calculation of fuel element size; Murray, "Nuclear Reactor Physics," Prentice-Hall, Inc. (1957), pages 60 and 123, discusses moderator sizes; and said volume 8, pages 453–466, discussed above, discusses sizes of thermal neutron barriers or absorbers.

For example, as to fuel, a 4-inch diameter cylinder of d-Pu becomes critical when it is about 2.5 inches high, whereas a cylinder of 93.5 percent U$^{235}$ of the same diameter becomes critical when it is about 7 inches high.

The following moderator thicknesses are comparable.

| Moderator material: | Thickness (inches) |
|---|---|
| H$_2$O | 5.5 |
| Be | 9.5 |
| BeO | 9.9 |
| D$_2$O | 10.8 |
| C | 18.4 |

Some suitable neutron absorbers vary in effectiveness as follows.

| Absorber material: | Thermal neutron cross section (in barns) |
|---|---|
| Boron | 750 |
| Cadmium | 2,400 |
| Europium | 4,500 |
| Samarium | 6,500 |
| Gadolinium | 44,000 |

The capsule power source 33 may be less than 1.5 cm. in diameter and composed of a mixture of radium and beryllium, or polonium and beryllium, or antimony$^{124}$ and beryllium in an amount sufficient to provide a neutron strength of about 10 millicuries. As such capsules are old in part 63 of FIGURE 1 of Frey, Jr., et al, 2,951,946 and part 80 of FIGURE 6 of Goodman 2,952,019, supra; part 32 of Tittle 2,769,918 of November 6, 1956; part 40 of Frey, Jr., et al. 2,778,950 of January 22, 1957; and parts 24 and 24' of Martin et al. 2,965,757 of December 20, 1960, no further description is believed necessary.

Because each stage or fuel element 34, 36 and 37 has characteristics approaching a critical system but is still subcritical, it is possible to operate at very high power levels and a very high neutron flux production without the fear of a destructive explosion, because the neutron production of the series of fuel elements will converge to the sum $1/(1-k)$ where $k$ is the effective multiplication factor for the system. An amplification gain from one fuel element to the next of as much as 10 is easily obtained without danger of explosion. By having the fuel elements 34, 36 and 37 in a plurality of subcritical masses separated by elements permitting neutron flow in one direction only, it is possible to generate sufficient power to merely excite the surrounding strata for well logging purposes, or to raise capsule 33 high enough to include more fuel elements to create sufficient power to heat the formation, or to raise capsule 33 still higher and include more fuel elements for the hydrolysis by heat of the surrounding oil shale, all without rendering any of the fuel supercritical and thereby risking an explosion.

While other means of hoisting and lowering the capsule power source 33 in the bore 32 may be employed, it is preferred to employ a rack 49 and pinion 51 driven by motor 52, which motor is mounted suitably on the inside of cap 28 and is connected by electric cable 55 to cables 22 and 18 and finally conductors 23 and 24 of motor control 21. In some respects, this is somewhat similar to rack 81 of FIGURE 6 of Goodman, supra. However, there are important differences in the operation of the present invention and Goodman in that the present motor 52 and motor control 21 is designed to fail safe in that upon failure of electrical current the weight of rack 49 and capsule 33 will turn the pinion and motor and carry capsule 33 down into the bottom of bore 32 inside the neutron shield 31, shutting off the nuclear reaction. In addition, capsule power source 33 is suspended from rack 49 by a thermal fuse link 54 which is a metal or alloy selected to melt at whatever temperature, such as 1000° F., is selected as the maximum temperature to be permitted. If this predetermined maximum is reached, fuse 54 melts and capsule power source 33 drops to the bottom of bore 32, ending the nuclear reaction in a very short time. The temperature selected as the maximum may vary widely depending on the materials of construction selected and their strength at that temperature.

The amount of nuclear reaction that occurs in the various fuel zones 34, 36 and 37 depends upon the position of capsule power zone 33. This is because fast neutrons emitted by capsule 33 which enter the pile of cylinders in casing 29 in an upwardly direction are forced to pass in series through a moderator 42 which will slow them down and convert them into thermal neutrons, which thermal neutrons are substantially all stopped by a thermal neutron absorber or barrier 43. Therefore, substantially no neutrons from power source 33 reach any higher than fuel element such as fuel element 37 in the position of capsule 33, as shown in FIGURE 2, whereas fast neutrons which travel downwardly from capsule 33 will initiate a nuclear reaction in the next lowest fuel shell 36 whether they pass directly into said fuel as fast neutrons or first pass through moderator 42 and become thermal neutrons, as thermal neutrons will still excite the fuel 36. Furthermore, fast neutrons from capsule 33 can pass downwardly first through absorber 41, which is effective only in absorbing thermal neutrons, so that the fast neutrons will continue on down through moderator 39 which slows them down and converts them to thermal neutrons, which thermal neutrons are still sufficient to excite a nuclear reaction in fuel element 34.

Furthermore, when a nuclear reaction is occurring with a good yield of fast neutrons in fuel element 36, a sufficient number of these fast neutrons will reach lower fuel element 34 as thermal neutrons having passed through absorber 41 as fast neutrons and through moderator 39 as thermal neutrons to excite an active nuclear reaction in lower fuel element 34, which action will be repeated for any other still lower fuel elements, but the nuclear action in fuel element 36 will not excite any nuclear reaction in a higher fuel element 37 or any other higher fuel elements (which may exist in broken away portion 46), because the fast neutrons from the nuclear reaction in fuel element 36 are slowed down to thermal neutrons by moderator 42 and these resulting thermal neutrons are substantially completely absorbed by absorber 43 and therefore do not reach fuel element 37 to excite the same.

Briefly, capsule power source 33 is exciting and causing nuclear reaction in all fuel elements below the capsule and is not causing nuclear reaction in any fuel element above the capsule. Therefore, by positioning the capsule at the desired point in this series of cylinders, as shown in FIGURE 2, any number of fuel elements can be excited.

FIGURE 3 is a schematic wiring diagram of a suitable manual control at the ground surface generally designated as 21 in FIGURE 1. As somewhat similar servo control systems are known to those skilled in the art and are shown schematically by U.S. patents to Frey, Jr., et al., 2,951,946 and Goodman, supra, it is believed unnecessary to show all the detailed wiring, power supply, fuses, and the like that those skilled in the art would use in such well known servo systems.

The position of capsule 33 in FIGURE 2 is determined by rack 49 moved by pinion 51 driven by motor 52. In FIGURE 3, motor 52 is shown as a servo motor which is driven in one direction, or in reverse, or held stationary, according to the electric current in field coil 56 reacting with the current in the armature coil of motor 52, which currents vary depending on the position of the manual control 57. A control voltage of the desired magnitude picked off of potentiometer 58 energized by battery 59 is applied through wires 23 and 24, through connections 61 and 62 (which connections are shown merely to avoid repetition of the remaining circuitry in FIGURES 4 and 5) and through wires 63 and 64 and potentiometer 66 and wire 67 to a conventional servo amplifier 68. The lower portion of FIGURE 3 below connections 61 and 62 can be located in box 60 connected by electric cable 65 to cable 22. The voltage from potentiometer 58 is opposed by that from 66 and the net positive or negative voltage is amplified and rotates motor 52 in one direction if negative and in the other direction if positive. In addition to raising or lowering rack 49, motor 52 also moves potentiometer pick-off contact 69 on potentiometer 66 by means of mechanical connection 71 to a point where the voltages from batteries 59 and 72 balance out or nullify each other, at which time motor 52 stops. This is well known in the art as a null type control. The variable resistance 73 may be set to adjust the relative null point positions of contacts 57 and 69.

Figure 4:
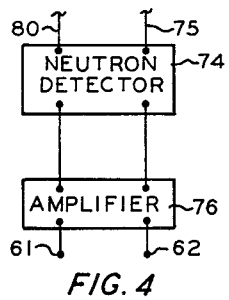
FIGURE 4 is a modification of a portion of FIGURE 3 changing the motor control to control by the amount of neutron flux at a point adjacent the uppermost fuel element.

Instead of a manual control system, as shown in FIGURES 1 and 3, often it is preferred to have a system controlled by the intensity of neutron flux at a selected point, preferably a point adjacent to the uppermost fuel element that it is desired to energize in the operation proposed, in which case the wiring of FIGURE 3 can be modified above contacts 61 and 62 as shown in FIGURE 4. A suitable neutron detector 74 is connected through amplifier 76 to contacts 61 and 62 of FIGURE 3 in place of wires 23 and 24. Such neutron detection control is old in 45 of Frey et al. 2,951,946, supra, and needs no further description. An indication at the surface of the neutron flux produced can be obtained by neutron log 20 through wires 75 and 80.

Figure 5:
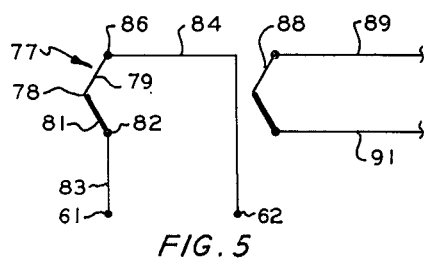
FIGURE 5 is a third species in which a portion of FIGURE 3 is changed to control the motor by the temperature at a point adjacent the uppermost fuel element.

Instead of either manual or neutron flux control, it is often preferred to have the system controlled by the temperature at a selected point, preferably a point adjacent to the uppermost fuel element, that it is desired to energize in the operation proposed. This modification can be accomplished by substituting the thermocouple voltage generator 77 with a hot junction 78 formed by the junction of suitable dissimilar metals 79 and 81 and a cold junction 82 where dissimilar metals 81 and 83 join. Metals 79 and 84 can be similar, in which case the position of junction 86 is immaterial. Hot junction 78 should be adjacent the point of temperature measurement (as 28 of Goodman, supra), while cold junction 82 should be at a cooler point in the well (as 30 of Goodman, supra). The circuit of FIGURE 5 is connected to points 61 and 62 in place of wires 23 and 24 of FIGURE 3. As such temperature type control is shown by Goodman, supra, further description is believed unnecessary.

An indication at the surface of the temperature attained at 78 can be obtained on remote temperature indicator 87 by a second thermocouple 88 connected thereto by wires 89 and 91, all as known in the prior art of telemetering.

A neutron amplifier of the present type uses a movable source in the center of a cylindrical array of an amplifier for controlling fission. This reactor is subcritical and the fission controllable, thus making it applicable for well logging or heating. Different power levels of operation will be used for logging or heating.

At present, well logging sources of the prior art are not stronger than $10^8$ n/sec. and this only permits the activation of the more abundant elements like oxygen and silicon. The neutron source of the present invention with higher output will also permit activation logging for aluminum, magnesium, chlorine, and other less abundant elements.

In a logging system this invention easily supplies neutrons to activate the various elements and one or more detectors (not shown) may be used to detect back-scattered neutrons and gamma, alpha or beta rays, all as in the prior art. Discriminators (not shown) may be used in the detector circuits to isolate energies of the various secondary activities so as to identify different elements found in a formation, all as in the prior art.

Conventional bottom hole heaters in combination with pumps in the prior art use hot water or electricity and increase the production to an average of 10 barrels per day. In some cases, the production rate could be doubled by using the present invention. The self-contained, low power reactor of the present invention suspended below a pump in a well (not shown) would do this production-type heating ideally, because it transmits energy directly into the formation.

Generally, oil from shales is produced in the prior art by mining the rock and heating the crushed material in retorts. However, pyrolysis in situ can also be developed to a commercially profitable operation, as has been demonstrated in the prior art in Sweden, where many electric heating elements are used to preheat the formation to 280° C. (for three months) and then to heat it to 380° C. (for one to two months). One immediately realizes the possibilities of the reactor of the present invention for similar in situ pyrolysis of oil shales. It should be mentioned at this place that, according to G. Salomonsen from the Swedish Shale Oil Company, nuclear explosions of the prior art are not suitable for the heating of shales because these shales have very low heat conductivities. Neither does he believe that the breaking of rock by nuclear explosions with subsequent in situ combustion will be successful because the combustion reaction is controlled by diffusion in the pores of the shale and therefore small particles are mandatory for a controlled combustion. Nuclear explosions, however, will result in particles of different sizes and controlling the combustion should be difficult.

The best production method for oil in tar sands has not been found. The Canadian Oil Sands, Ltd., believe that they can produce crude for $1.82 per barrel by mining and hot water treatment of the same as in the prior art. However, mining of these sands is somewhat difficult. Other production methods that have been proposed are in situ combustion and atomic explosions. Unfortunately, a big amount of the energy released in nuclear explosions is used up for the evaporation of water. A nuclear reactor such as described here would transmit energy at a slower rate and therefore more of it could be used for more effective heating of the sands than a nuclear explosion.

While three specific embodiments of this invention have been shown for purposes of illustration, the invention is obviously not limited thereto.

Having described my invention, I claim:

1. A nuclear reactor comprising in combination:
   a first nuclear fuel element;
   a first layer of neutron-slowing moderator material;
   a second layer of thermal neutron barrier material; and
   a second nuclear fuel element;
   said first element, first layer, second layer and second element being disposed in serial order as named adjacent each other along an axis;
   a primary neutron generator; and
   means to move said generator parallel to said axis from a point adjacent one of said fuel elements and on one side of said layers to a point adjacent the other of said fuel elements and on the other side of said layers;
   said fuel elements each being of subcritical size and disposed to be activated by neutrons from said primary generator when adjacent thereto into a nuclear reaction producing sufficient numbers of fast nascent neutrons to in turn activate an adjacent fuel element into a similar reaction by passing said nascent neutrons through said second and first layers in that order, but insufficient numbers to activate an adjacent fuel element through said first and second layers in that order;
   said subcritical size resulting in dieing out of said reaction in any of said fuel elements when not activated by sufficient neutrons coming from said primary neutron generator and adjacent fuel element; and
   said first and second layer in that order being sufficient to prevent neutrons from said primary generator and the fuel element adjacent said first layer from passing into said other fuel element in sufficient numbers to substantially increase the production of fast nascent neutrons therein.

2. The combination of claim 1 in which a bore is provided through said fuel elements and layers and the movement of said primary neutron generator is through said bore.

3. The combination of claim 1 in which said axis is vertical and said second layer is above the adjacent first layer.

4. The process of controlling the nuclear reactor of claim 1 to produce energy at a desired predetermined rate comprising the steps of measuring the rate of energy generated by said reactor and moving said primary neutron generator parallel to said axis to a point where the reactor will produce energy at said desired rate by moving said generator relative to said layers in the direction from the second to the first fuel element to reduce the rate of energy generation, and in the direction from the first to the second fuel element relative to said layers to increase the rate of energy generation.

5. The combination of claim 3 in which the means to move said generator includes a thermal fuse link constructed to release said generator when a predetermined temperature is exceeded.

6. The combustion of claim 3 in which the means to move said generator is responsive to manual remote control.

7. The combination of claim 3 in which the means to move said generator is responsive to the temperature at a point adjacent the uppermost fuel element.

8. The combination of claim 3 in which the means to move said generator is responsive to the neutron flux at a point adjacent the uppermost fuel element.

9. The combination of claim 3 including a radiant energy detector screened from direct radiation from said reactor but disposed to receive reactor-induced radiation from surrounding earth formations, and means to record said induced radiations.

10. The process of claim 4 in which the process is carried out in a well and the radiant energy response of selected elements in the formation to the resulting neutron bombardment is detected and recorded relative to the position of a radiant energy detector in said well to form a log of said well.

11. The process of claim 4 in which the process is carried out in a well in a hydrocarbon-bearing formation and the reactor is controlled at an energy level sufficient to heat the well to a degree sufficient to materially increase the natural flow of liquid hydrocarbons in the formation into said well.

12. The process of claim 4 in which the process is carried out in a well in an oil shale formation and the reactor is controlled at an energy level sufficient to produce in situ pyrolysis of a substantial amount of said surrounding oil shale.

13. The process of claim 4 in which the rate of energy generated by the reactor is determined by measuring the temperature at a point adjacent said second nuclear fuel element.

14. The process of claim 4 in which the rate of energy generated by the reactor is determined by measuring the neutron flux at a point adjacent said second nuclear fuel element.

References Cited in the file of this patent
UNITED STATES PATENTS

| | | |
|---|---|---|
| 2,825,689 | Szilard | Mar. 4, 1958 |
| 2,952,019 | Goodman | Sept. 6, 1960 |
| 2,951,943 | Goodman | Sept. 6, 1960 |
| 2,951,946 | Frey | Sept. 6, 1960 |
| 2,984,745 | Scherbatskoy | May 16, 1961 |
| 3,070,697 | Muench | Dec. 25, 1962 |
| 3,085,957 | Natland | Apr. 16, 1963 |